INVENTORS
ANGELO R. DE VITO
EDWIN L. ALLEN
BY
ATTORNEYS

April 5, 1960

A. R. DE VITO ET AL 2,931,677

DOOR CONTROL MECHANISM

Filed March 14, 1956

INVENTORS
ANGELO R. DE VITO
BY EDWIN L. ALLEN

ATTORNEYS

April 5, 1960 — A. R. DE VITO ET AL — 2,931,677
DOOR CONTROL MECHANISM
Filed March 14, 1956 — 7 Sheets-Sheet 4

INVENTORS
ANGELO R. DE VITO
BY EDWIN L. ALLEN
Hudson, Boughton,
Williams, David & Hoffmann
ATTORNEYS April 5, 1960 A. R. DE VITO ET AL 2,931,677
DOOR CONTROL MECHANISM
Filed March 14, 1956 7 Sheets-Sheet 5

INVENTORS
ANGELO R. DE VITO
BY EDWIN L. ALLEN
ATTORNEYS

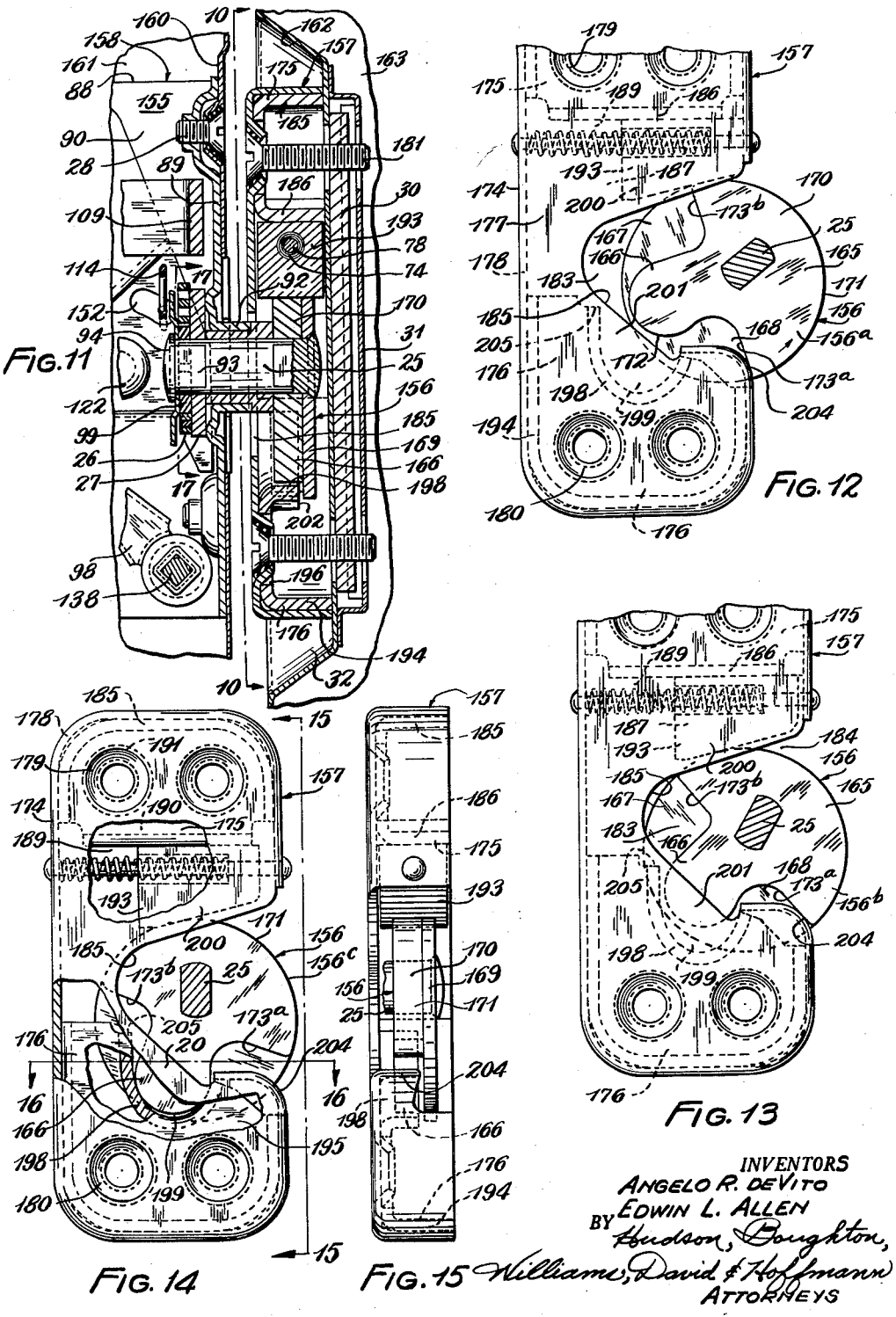

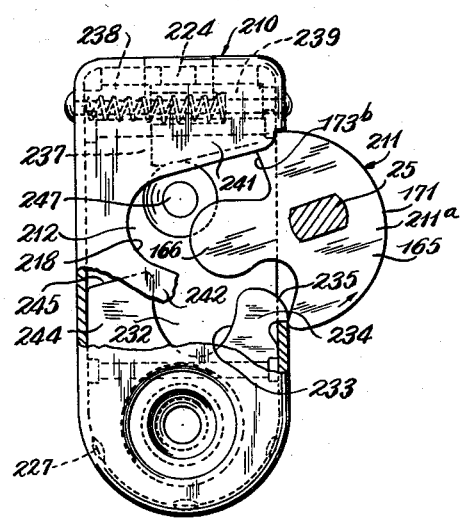
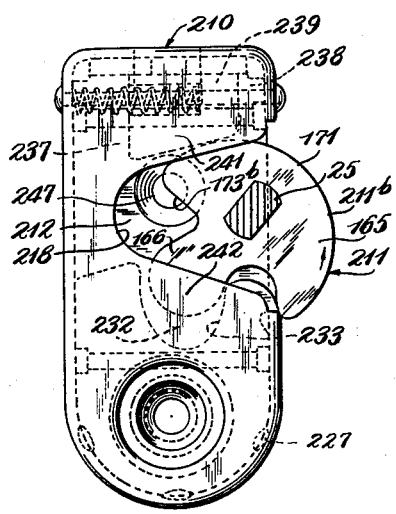
FIG. 18   FIG. 19
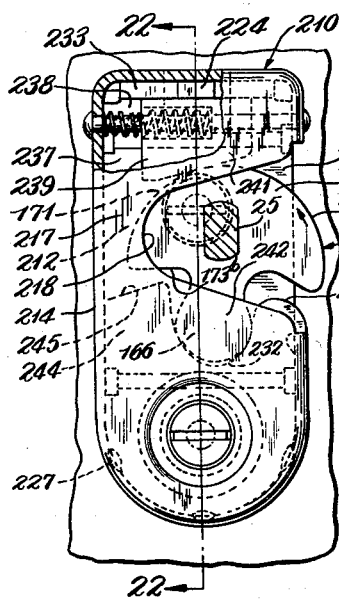
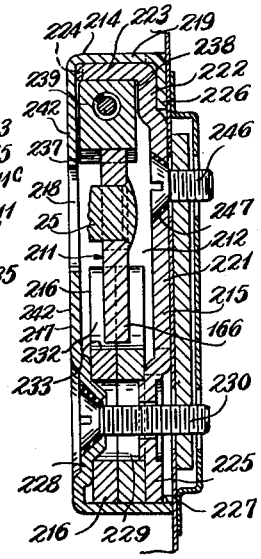
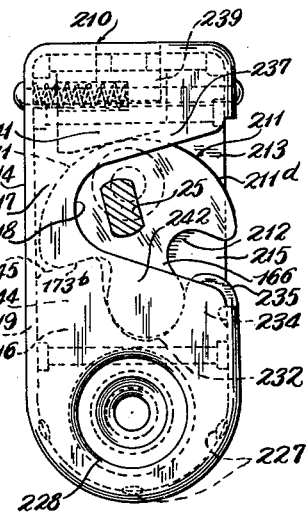
FIG. 20   FIG. 22   FIG. 21
INVENTORS
ANGELO R. DeVITO
BY EDWIN L. ALLEN
ATTORNEYS

United States Patent Office 2,931,677
Patented Apr. 5, 1960

2,931,677

DOOR CONTROL MECHANISM

Angelo R. De Vito and Edwin L. Allen, Cleveland Heights, Ohio, assignors, by mesne assignments, to Lisle W. Menzimer, trustee, Rockford, Ill.

Application March 14, 1956, Serial No. 571,560

9 Claims. (Cl. 292—229)

This invention relates to closure control mechanisms of the releasable latch type for controlling the latching, or latching and locking, of doors and other closures. The invention can be applied to doors of various kinds but is especially useful for controlling the doors of automobiles and other vehicles, and accordingly, is hereinafter described as applied to vehicle door use without any intention of limiting the invention solely thereto.

In the control of vehicle doors, latch mechanisms have been provided heretofore for controlling door movement in two different directions. Thus, Patent 2,156,874 discloses latch mechanism which controls in-and-out movement of a vehicle door to and from its closed position, and also controls movement of the door in the general direction of its hinge axis for preventing rattling of the door when it is in its fully closed and latched position. Such two-directional control of vehicle doors does not take care of a situation where relative springing, occurring between the door and its associated door frame or body pillar as the result of a collision, causes separation in a general fore and aft direction between a latch member and its associated keeper. Such a fore and aft relative separating movement caused by a collision often permits a vehicle door to fly open, with the result that passengers may suffer severe injury by being thrown out of the vehicle.

The present invention has, as one of its objects, the elimination of this hazardous condition by providing door control mechanism of a so-called "safety" type in which door control in a third, or fore and aft direction, is achieved by novel means and substantially prevents such accidental door opening.

Another object is to provide a novel door control mechanism of the safety type in which a cooperating latch member and keeper have an engaged or door-latched position establishing a fore and aft interlock therebetween for preventing accidental door opening, and which mechanism may, if desired, be made to also embody a door-holding feature for preventing relative movement of the door in the general direction of its hinge axis and a door throw-out feature enabling the latch arm to assist the initial door-opening movement.

Still another object is to provide such novel door control mechanism of the safety type in which the latch member comprises a single rockshaft-supported swingable latch arm whose free end is engageable in a locking pocket of a keeper recess, and in which restraining means prevents a relative disengaging movement between the arm and keeper in the general direction of the rockshaft axis.

A further object is to provide door control mechanism of the swingable latch arm type in which the keeper is of a novel, yet simple and relatively inexpensive form, and in which the restraining means for preventing the relative axial disengaging movement is incorporated in the keeper and associated with the locking pocket or pockets thereof.

Yet another object is to provide a safety type door control mechanism in which a swingable latch member having a latch arm, also has a thrust means engageable with a restraining or stop means of the keeper for preventing the relative axial disengaging movement when the latch arm is engaged in the locking pocket of the keeper.

As still another object thereof, this invention provides a novel form of keeper for use with a door latch device for accomplishing a safety interlock between such keeper and a swingable latch member.

Additionally, this invention provides door latch mechanism of the type employing a rockshaft assembly carrying a latch member and in which a novel construction for the rockshaft assembly is such as to enable the same to safely resist the force imposed thereon by the anti-separation safety feature.

Other objects and advantages of this invention will become apparent in the following detailed specification and in the accompanying sheets of drawings forming a part thereof, and in which:

Fig. 3 is a vertical sectional edge view taken on line 3—3 of Figs. 1 and 4 and looking toward the edge of the associated door frame or body pillar, the latter being shown mainly in elevation;

Fig. 11 is a vertical section through this modified door control mechanism, as indicated by section line 11—11 of Figs. 9 and 10;

Figs. 12, 13 and 14 are vertical sections, similar to Fig. 10 but of a somewhat diagrammatic form, showing different positions of the latch member relative to its associated keeper;

Fig. 15 is an edge view of the keeper of this modified door control mechanism, the keeper being in detached relation and viewed as indicated by directional line 15—15 of Fig. 14;

Figure 1:
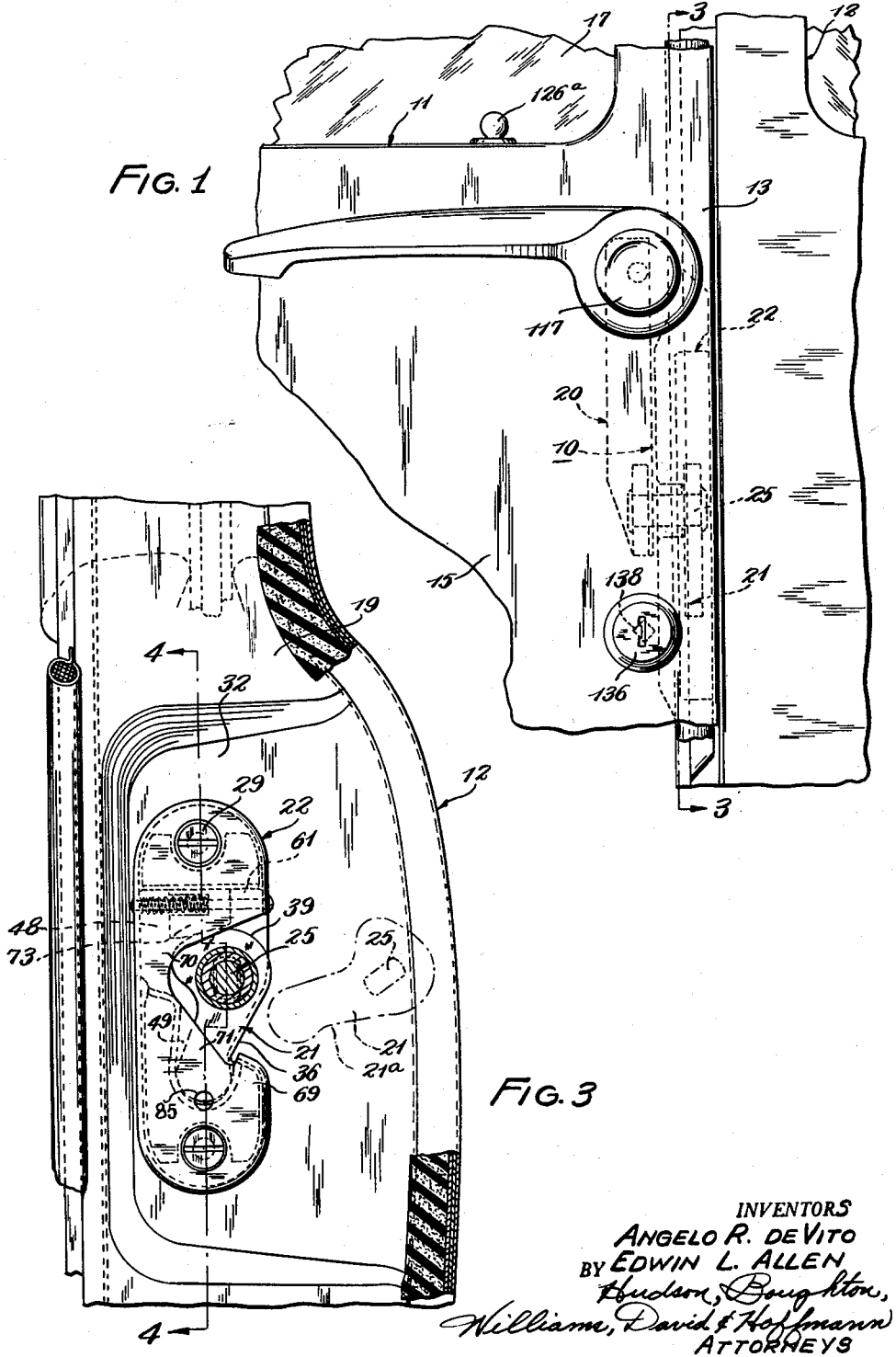
Fig. 1 is a partial side elevation of vehicle construction embodying the safety door control mechanism of the present invention, the view showing, by way of example, a portion of the left front door and the adjacent portion of an associated door frame or body pillar.

Figs. 18 to 21 inclusive are elevations of another form of keeper intended for use in a safety type door control mechanism, these views also showing different relative positions of a latch member being moved into the keeper; and Fig. 22 is a vertical section taken through the keeper and latch member as indicated by section line 22—22 of Fig. 20.

In Figs. 1 to 8 inclusive one form of closure control mechanism 10 of the present invention is shown, by way of example, and is applied to cooperating relatively movable door and doorframe structures 11 and 12. The door structure 11 is here shown as being the left front door of an automobile and the frame structure 12 is here represented as being a frame member or body pillar, with which the free or rear edge 13 of the door cooperates when the door is in its closed position. The door 11 is swingable about a substantially vertical hinge axis provided by hinge means (not shown) located adjacent the front edge of the door.

The door 11 can be of a conventional construction comprising inner and outer panels 14 and 15 defining an inner door space or chamber 16 therebetween into which a window glass 17 is movable, and an upright edge wall 18 at the rear edge of the door. The doorframe or body pillar 12 may also be of a conventional construction and includes an upright edge wall 19 facing the door opening. When the door 11 is in its closed position, the edge walls 18 and 19 lie in a substantially opposed fore and aft relation adjacent a parting or cleavage plane.

The door control mechanism 10 comprises, in general, a latch device 20 which includes a movable latch member 21, and a keeper 22 with which the latch member cooperates. The latch device 20 is shown and described herein as being mounted on the door 11 and the keeper 22 as being mounted on the doorframe 12. It will be understood, of course, that this relative arrangement can be reversed if desired by having the latch device 20 mounted on the doorframe and the keeper 22 mounted on the door.

As has been indicated above in a general way, the door control mechanism 10 is of the safety type and achieves a fore and aft interlock between the latch member 21 and the keeper 22. This interlock prevents relative separating movement in a third direction, namely a fore and aft direction, between the door and doorframe members 11 and 12 in addition to the two-directional door holding action heretofore accomplished, namely a holding of the door in the in-and-out swinging direction and a holding of the door in the general direction of its hinge axis.

The components of the latch device 20 for actuating and controlling the latch member 21 will be described in detail hereinafter, but at this point it should be explained that for the purposes of the present invention the latch member is preferably, though not necessarily, of the single arm type and is swingably supported adjacent the edge wall 18 of the door 11 by a rockshaft 25. It should also be explained at this point that the latch device 20 includes a spiral spring 26 disposed around the rockshaft 25 and that swinging of the latch member 21 to a door-latched position is produced by cooperation of the latch member with the keeper 22 during the closing movement of the door and is in opposition to the spiral spring. Swinging of the latch member 21 in the opposite direction, that is in a door throw-out direction relative to the keeper 22 is produced by the force of the spring 26 when a control member 27, fixed on the rockshaft 25, is released to permit rocking of the rockshaft in the throw-out direction.

When the latch device 20 is mounted on the door, as in the accompanying drawings, it is located in the door chamber 16 with the rockshaft 25 extending through the edge wall 18 and swingably supporting the latch member 21 adjacent the latter. The latch device can be secured to the edge wall 18 as by means of mounting screws 28. When the keeper 22 is mounted on the doorframe 12, it can be secured to the edge wall 19 thereof by the mounting screws 29. The screws 29 engage in threaded openings of an anchor plate 30 which is located behind the edge wall 19 and confined by a hollow bracket 31 secured to the latter. The edge wall 19 is preferably provided with a shallow recess 32 in which the keeper 22 is located.

As shown in the drawings, the latch member 21 is a generally flat member having a body portion 33 which is fixed on the rockshaft 25, as by means of the flatted and headed portions 34 and 35 of the latter, and an arm 36 projecting from the body portion 33 and extending in a depending relation to the rockshaft. The latch member 21 can be a plate-like member of a substantially uniform thickness in the direction of the axis of the rockshaft 25 and has substantially flat side faces 37 and 38 lying in substantially axially spaced parallel planes.

The body portion 33 of the latch member 21 is relatively wider than the arm 36 in a direction transversely of the rockshaft axis and, for the major portion of its perimeter, has a convexly curved flat edge face defining a cam 39. The body portion 33 also includes a lobe portion 40 which merges with and is a continuation of the cam 39. The latch arm 36 can be of various specific shapes and is here shown as having relatively straight substantially parallel edges 41 and 42 extending away from the rockshaft 25 and whose lower ends merge with a convex circular segment which defines the lower or free end 43 of the latch arm.

The keeper 22 is a vertically elongated structure, which, in this instance, comprises a front member 44 in the form of a hollow housing or cover member and an inner means in the form of a rear member 45 disposed in the cover member. As shown in the drawings, the keeper 22 is a generally flat hollow structure having a recess 46 lying in the general plane of the structure and extending thereinto edgewise thereof from an access opening 47 in one edge of the structure. Cooperating portions of the cover member and rear member define upper and lower pocket portions 48 and 49 in the keeper on opposite sides of the access opening 47 and which are in communication with the recess 46 and constitute locking pockets or locking pocket extensions thereof.

The cover member 42 of the keeper 22 can be a sheet metal stamping and comprises a substantially flat front wall 50 having a marginal or edge flange 51 extending rearwardly therefrom around the perimeter thereof, such that this cover member has a rearwardly dished shape with a shallow chamber 52 in the rear side thereof. The front wall 50 is provided, at suitable points, with countersunk portions 53 having holes therein to accommodate the above-mentioned fastening screws 29 by which the keeper 22 is secured to the edge wall 18 of the doorframe 12.

The rear member 45 can also be formed as a sheet metal stamping and is a vertically elongated member lying in the rear chamber 52 of the cover member 44. The rear member 45 has upper and lower generally flat forked end portions 55 which lie against the rear surface of the front wall 50 and are welded or otherwise secured thereto. These forked ends 55 have slots 55a therein which straddle the countersunk portions 53 of the front wall 50.

The intermediate portion of the rear member 45 includes a substantially flat plate or wall portion 58 which is offset axially or rearwardly from, and in a substantially parallel spaced relation to, the front wall 50 and has its rear surface lying substantially in the same plane as the rear edge of the marginal flange 51. The space between the front and rear walls 50 and 58 defines the recess 46 and the locking pocket extensions 48 and 49 thereof. The rear member 45 includes axially or rearwardly extending wall portions 59 and 60 adjacent the upper and lower ends of the recess 46. The wall portion 59 is a substantially straight wall portion transversely of the keeper 22. The extreme upper portion of the upper locking pocket 48 forms a transverse guideway 61 adjacent the wall portion 59 and whose purpose is explained hereinafter. The wall portion 60 is a curved or contoured wall portion which defines the lower locking pocket 49.

The wall portion 60 forms the edge wall of the locking pocket 49 with the two substantially straight wall portions 62 and 63 forming two of the side walls of this pocket, and with the concave wall portion 64 connecting these straight wall portions and defining the lower end of this pocket. At the upper end of the straight wall portion 62, the edge wall 60 extends away from the pocket 49 toward the edge flange 51 of the housing 44 as an inclined relatively short straight wall portion 65 forming an overtravel stop for a purpose explained hereinafter.

The marginal or edge flange 51 of the cover member 44 extends around the full perimeter thereof with the exception of an interruption in this flange forming the access opening 47 leading into the recess 46 for admitting the latch member 21 to the latter. The upper and lower locking pockets 48 and 49 are located in the keeper 22 so as to lie adjacent to but inwardly from the upper and lower edges of the access opening 47. As shown in the drawings, the front wall 50 of the cover member 44 has a notch 67 extending thereinto in the plane thereof from the access opening 47 and which provides clearance for the rockshaft 25 when the latch member 21 is being moved into the recess 46. The pocket portions 48 and 49 of the keeper recess 46 thus lie on opposite sides of the notch 67.

The marginal flange 51 is provided with a convexly curved portion 68 adjacent the lower edge of the access opening 47 and which curves inwardly toward the locking pocket 49. This curved flange portion 68 cooperates with the portion 63 of the edge wall 60 in forming a hook-like portion or barrier 69 alongside the pocket 49. This hook portion 69 retains the arm 36 in the keeper 22 when the arm is engaged, or partially engaged, in the pocket 49. It is important to also observe that portions of the front wall 50 which are adjacent to the upper and lower edges of the notch 67, form cover portions 70 and 71 overlying the locking pockets 48 and 49 and constitute a restraining means for preventing disengagement of the latch member 21 from the keeper 22 by a relative axial separating movement therebetween, as will be further explained hereinafter.

The keeper 22 preferably includes a wedge block 73 movable in the guideway 61 for cooperation with latch member 21 in a similar manner and for the same general purpose as the corresponding wedge blocks disclosed in earlier Patents 2,156,874 and 2,674,483. The latter patent also discloses a swingable latch member having a single latch arm engageable in a relatively offset locking pocket of a keeper. In neither of these patents, however, does the door control mechanism embody any means for achieving the above-mentioned fore and aft interlock nor any means for preventing a relative fore and aft separation between the latch member and keeper in the event of a collision, as is accomplished in the door control mechanisms of the present invention.

The wedge block 73 is movable in the guideway 61 by being slideable on a transverse pin 74 which extends through the guideway and has its ends secured to the marginal flange 51 of the cover member 44 by the riveted portions 75. The wedge block 73 has a flat upper surface 76 which lies against and is slideable along the adjacent face of the wall portion 59 and also has a tapered lower edge 77 which is presented in a downwardly facing relation toward the recess 46. The wedge block 73 normally occupies a position in the guideway 61 adjacent the access opening 47 and is urged toward this position by a compression spring 78 disposed around the pin 74. One end of this spring seats on the wedge block 73 by being engaged in a counterbore 79 thereof and the other end of the spring seats against an opposed portion of the edge flange 51.

Figure 2:
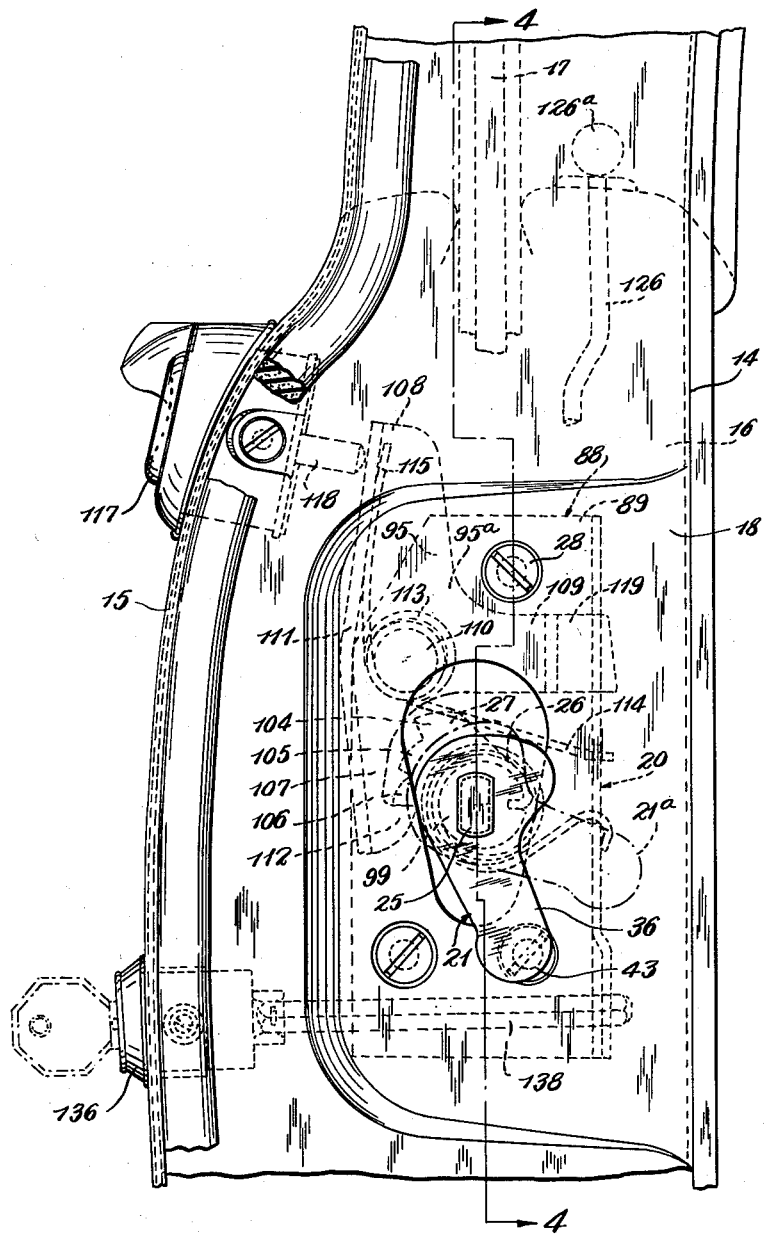
Fig. 2 is an elevational edge view showing the rear or free edge of the left front door and the latch device carried thereby.

When the door 11 is in its open position, the latch member 21 occupies the initial broken-line position 21ª shown in Fig. 2 in which the latch arm 36 appears to have been swung in a counterclockwise direction about the axis of the rockshaft 25 so as to occupy a relatively inclined position extending downwardly toward the right. As the door 11 is swung toward its closed position, the latch member 21 advances into the recess 46 of the keeper 22 through the access opening 47 with a combined translatory and swinging movement. The translatory movement results from the bodily movement of the latch member with the door 11, and the swinging movement is a counterclockwise swinging of the latch member about the axis of the rockshaft 25 resulting from the cooperation of the latch member with the keeper. During this combined translatory and swinging movement of the latch member 21, the body portion 33 thereof advances into the upper locking pocket 48 and the arm 36 moves with a generally endwise movement into the lower locking pocket 49.

Figure 5:
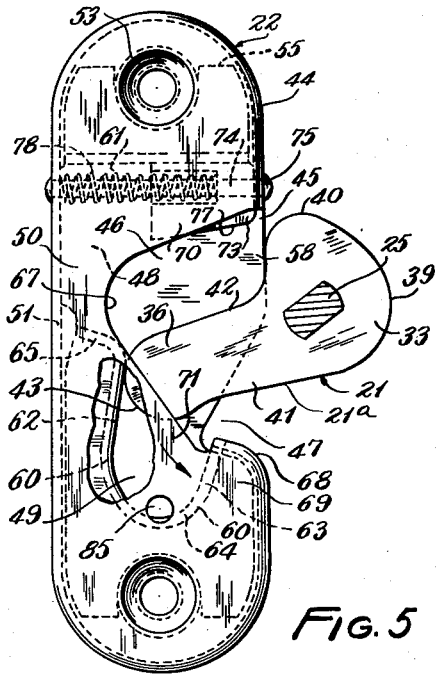
Figs. 5, 6 and 7 are vertical sections, similar to Fig. 3 but of a somewhat diagrammatic form, showing different relative positions of the latch member while moving into the keeper.
Figure 6:
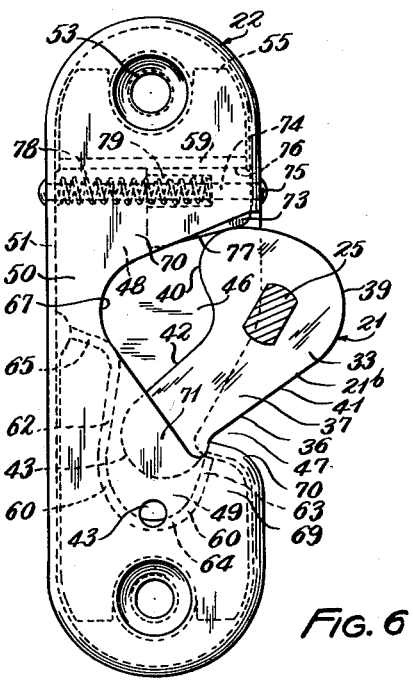
Figure 7:
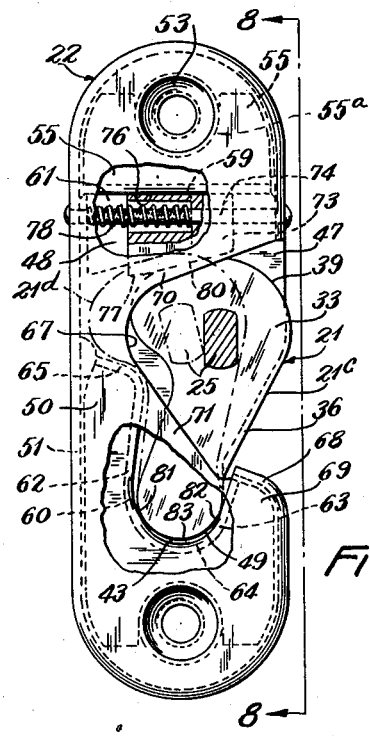
Figure 8:
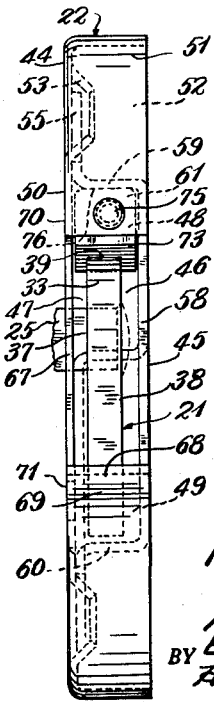
Fig. 8 is an edge view of the keeper in detached relation and when viewed as indicated by the directional line 8—8 of Fig. 7.

Figs. 5, 6 and 7 of the drawings show different positions 21ª, 21ᵇ, 21ᶜ and 21ᵈ of the swinging and translatory movement of the latch member 21, as the latter advances into the keeper 22 while the door 11 is being swung from an open position to a closed and door-latched position. Fig. 5 shows the relative position 21ª of the latch member 21 when the closing movement of the door 11 has caused the rounded free end 43 of the latch arm 36 to enter the recess 46 and engage the relatively straight wall portion 62 of the lower locking pocket 49. The Fig. 5 position of the latch arm 36 results from a translator movement only of the latch member since the engagement of the end 43 with the wall portion 62 occurs prior to any relative swinging movement of the latch member about the rockshaft axis.

Fig. 6 shows the relative position 21ᵇ of the latch member 21 when the arm 36 has partially entered the lower pocket 49 of the keeper 22 and is in the position corresponding with a partially latched condition of the door 11. At this time the latch member 21 has been swung in a counterclockwise direction by a downward sliding of the rounded free end 43 of the latch arm 36 on the relatively straight wall portion 62. This counterclockwise swinging of the latch member 21 has advanced the free end 43 part-way into the pocket 49 and has brought the outer edge of the latch arm into a door-holding engagement with the hook portion 69 of the keeper. This Fig. 6 position 21ᵇ of the latch member 21 corresponds with the so-called secondary latch position of the door.

Fig. 7 shows the latch member 21 in full lines in its door-latched position 21ᶜ which corresponds with a fully latched, or latched and locked, condition of the door 11. When the latch member 21 is in the door-latched position 21ᶜ its arm 36 extends downwardly into the lower locking pocket 49 of the keeper 22 for the full depth of this pocket. At this time the body portion 33 of the latch member extends part-way into the upper locking pocket 48 with the cam 39 engaging the sloping edge 77 of the wedge block 73. During the movement of the latch arm 36 to the door-latched position 21ᶜ, the cam 39 has been rocked in a counterclockwise direction against the wedge block 73 and has displaced the latter inwardly of the keeper along the guideway 61 and the pin 74 to the position in which this wedge block is shown in Fig. 7.

When the latch member 21 has assumed its door-latched position 21ᶜ in the keeper 22, it has a three-point engagement therein by which the latch member is firmly held in the keeper for a minimum amount of relative rocking of the latch member therein and with the latch member being held against any relative vertical shifting and corresponding rattling of the door. In this three-point engagement one point, indicated at 80 in Fig. 7, is between the cam 39 and the sloping edge 77 of the wedge block 73 and two other contact points 81 and 82 occur between the rounded free end 43 of the latch arm 36 and the concave wall portion 64 of the locking pocket 49. The contact points 81 and 82 lie on opposite sides of the axis of the latch arm 36 while the extreme end of the latch arm is spaced from the edge wall of the pocket 49 by the clearance space 83.

One of the important features of the present invention resides in the fact that when the latch member 21 has been moved into the keeper 22 to either of the positions 21ᵇ or 21ᶜ, the above-mentioned fore and aft interlock between the latch member and keeper is achieved for preventing unintentional or accidental disengagement of the latch member from the keeper. As has been pointed out above, portions 70 and 71 of the front wall 50 overlie the upper and lower locking pockets 48 and 49 and constitute latch-retaining elements engageable, respectively, by the body and arm portions of the latch member 21 for preventing the latch member from moving out of the keeper 22 except by a disengaging movement of the latch member substantially in its own plane and in the plane of the recess 46, or in other words, by a movement in a plane extending substantially in the direction of the parting or cleavage plane between the edge walls 17 and 18 of the door and door frame.

Thus, when the latch member 21 is engaged in the keeper 22 to the partial extent of the secondary latch position 21ᵇ shown in Fig. 6, the free end of the latch arm 36 extends part-way into the pocket 49 and lies behind or beneath the wall portion 71 overlying this pocket. The wall portion 71 thus confines the latch arm 36 to the pocket 49 by preventing the arm from being disengaged from the pocket by a separating movement of the arm relative to the keeper 22 in the general direction of the axis of the rockshaft 25.

When the latch member 21 has assumed its door-latched position 21ᶜ of Fig. 7, the body portion 33 has moved into the upper locking pocket 48 as explained above, and lies behind or beneath the wall portion 70 while the free end of the latch arm 36 has moved for the full distance into the lower locking pocket 49 and is covered by the wall portion 71 to an even greater extent than in the secondary latch condition of Fig. 6. Since the upper and lower portions of the latch member 21, that is to say the body and arm portions of this member located on opposite sides of the rockshaft axis, are engaged behind or beneath the wall portions forming the latch-retaining elements 70 and 71 of the keeper 22, it will be seen that a safe and very strong fore and aft interlock has been established between the latch member and keeper without any tendency to cock or tilt the rockshaft. An accidental separation or pulling apart of the latch member and keeper will thus be prevented and, accordingly, the likelihood of the door flying open upon the occurrence of a relative springing between the door and door frame resulting from a collision, is substantially eliminated.

Fig. 7 also shows a broken line overtravel position 21ᵈ to which the latch member 21 is movable by the momentum of the door 11 when the latter is slammed shut. As the latch member moves from its door-latched position 21ᶜ to its overtravel position 21ᵈ, the spiral spring 26 of the latch device 20 is further stressed to more strongly resist the counterclockwise swinging of the latch member and thus check the overtravel movement. If the overtravel movement is not completely stopped by the increasing resistance of the spiral spring, it will be stopped by the engagement of the lobe 40 with the wall portion 65 as a stop means. By the time that the lobe 40 comes into engagement with the stop 65, the loading of the spiral spring 26 will have substantially absorbed the force of the door momentum for shock elimination and will enable the spring to readily return the latch member to its door-latched position 21ᶜ.

When the keeper 22 is constructed and mounted as described above in connection with Figs. 1 to 8 inclusive, the rear edge of the marginal flange 51 of the cover member 44 and the rear face of the plate portion or wall 58 of the rear member 45 seat against the edge wall 19 of the doorframe 12 and the keeper occupies a relatively protected position in the recess 32. The cover member 44 of the keeper is reinforced by the rear member 45 which forms a filler means therein and enables the keeper to resist collapse or distortion. The front wall 50 of the cover member 44 is preferably provided with a drain opening 85 adjacent the lower end of the locking pocket 49 for the escape of water, dust, or other foreign matter from this pocket.

Any suitable form of latch device can be employed for controlling and actuating the latch member 21, and by way of example, the drawings show the latch device 20 for this purpose and which controls and actuates the latch member through the above-mentioned rockshaft 25. The latch device 20 is provided with a carrier 88 on which the various components are mounted and which carrier is here shown as being a substantially L-shaped plate member having plate portions 89 and 90 extending in a substantially right angle relation to each other. The latch device 20 is mounted on the door 11 by having the above-mentioned mounting screws 28 engage in threaded openings provided in the plate portion 89. The rockshaft 25 extends through, and is journaled in, a hollow bushing 91 which is supported by a sleeve projection 92 of the plate portion 89. The latch member 21 is mounted on the outer end of the rockshaft, as previously explained herein. The inner end of the rockshaft projects from the bushing 91 and is provided with a flatted portion 93 and an upset head 94.

Figure 17:
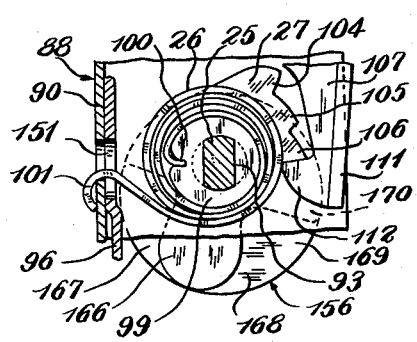
Fig. 17 is a fragmentary vertical sectional view taken transversely of the rockshaft of the latch device of Fig. 11, as indicated by section line 17—17 thereof.

In addition to the rockshaft 25 and the above-mentioned spiral spring 26 and control member 27, the latch device 20 comprises a detent lever 95, a locking lever 96, a control lever 97 and a control finger 98. The control member 27 is fixed on the rockshaft 25 by being mounted on the flatted portion 93 thereof. An anchor member 99 is disposed adjacent the control member 27 and is also fixed on the rockshaft by being mounted on the flatted portion 93. The spiral spring 26 is disposed around the anchor member 99 and lies adjacent the control member 27. The inner end of the spiral spring 26 is connected with the rockshaft 25 by being engaged in notch 100 of the anchor member 99 (see Fig. 17). The outer end of the spiral spring 26 is anchored on the plate portion 90, as by having a hook portion 101 engaged in an opening of the latter.

A cover plate 102 of disk shape is preferably provided on the rockshaft 25 in overlying relation to the spiral spring 26. The control member 27, the anchor member 99, and the cover plate 102 are all retained on the flatted portion 93 of the rockshaft by the upset head 94 of the latter. The use of the anchor member 99 for connecting the inner end of the spiral spring 26 with the rockshaft, permits the upset head 94 to be readily formed on the rockshaft without damage to the spiral spring or pinching thereof.

The control member 27 is a disk-like plate carrying a plurality of teeth 104, 105 and 106 with which the detent lever 95 cooperates for determining different positions of the latch member 21. The detent lever 95 (see Fig. 2) has an intermediate body portion 95ᵃ and a plurality of arms 107, 108 and 109 projecting from such body portion. The detent lever 95 is disposed with the body portion 95ᵃ thereof lying adjacent the plate portion 89, and pivotally mounted thereon by a pivot member 110 having a riveted or otherwise fixed connection with this plate portion. The detent lever 95 is preferably provided along one edge thereof with an angularly disposed reinforcing flange 111 which is continued along the arms 107 and 108 substantially to the outer ends thereof.

The arm 107 is a holding arm which extends in depending relation to the pivot 110 and carries a detent 112 for cooperation with the teeth 104, 105 and 106 of the control member 27. A wire spring 113 having a coiled intermediate portion mounted on the pivot 110 is effective on the detent lever 95 to normally swing the same in a counterclockwise direction, as seen in Fig. 2, to cause engagement of the detent 112 with one of the teeth 104, 105, and 106 of the control member 27. The spring 113 has a relatively stationary arm 114 engaged in an opening on the plate portion 90 and has a movable arm 115 extending outwardly along the arm 108 of the detent lever and applying pressure to the flange 111 for imparting swinging movement to the detent lever in the above-mentioned direction for engaging the detent 112 with the teeth of the control member 27.

When the detent 112 is in engagement with the tooth 104, the latch member 21 is being held in its initial position 21ᵃ which is shown in Fig. 5 and in broken lines only in Fig. 2. When the detent 112 is in engagement with the tooth 105, the latch member 21 is being held in the secondary latched position 21ᵇ of Fig. 6. Similarly, when the detent 112 is in engagement with the tooth 106, the latch member is in its final or door-latched position 21ᶜ shown in full lines in Figs. 2 and 7. Whenever the detent lever 95 is swung in a clockwise direction in opposition to the spring 113, the detent 112 will be disengaged from the tooth 106, or the tooth 105 as the case may be, thereby permitting the spiral spring 26 to swing the latch arm 36 in the door throw-out direction and to reengage the tooth 104 with the detent 112.

The clockwise swinging of the detent lever 95 for disengaging the detent 112 from the tooth 106 (or from the tooth 105), can be produced by a manually operable door-unlatching means accessible from the outside of the door 11, such as the push button 117 having a stem 118 engageable with the flange 111 of upwardly extending release arm 108 of the detent lever. This clockwise swinging of the detent lever 95 can also be produced by a second manually operable door-unlatching means (not shown) located on the inside of the door 11 and which is effective on an offset outer end portion 119 of the laterally extending release arm 109 of the detent lever, through the above-mentioned control lever 97 and a link 120 connected with the latter. This action of the control lever 97 is further described hereinafter.

Figure 4:
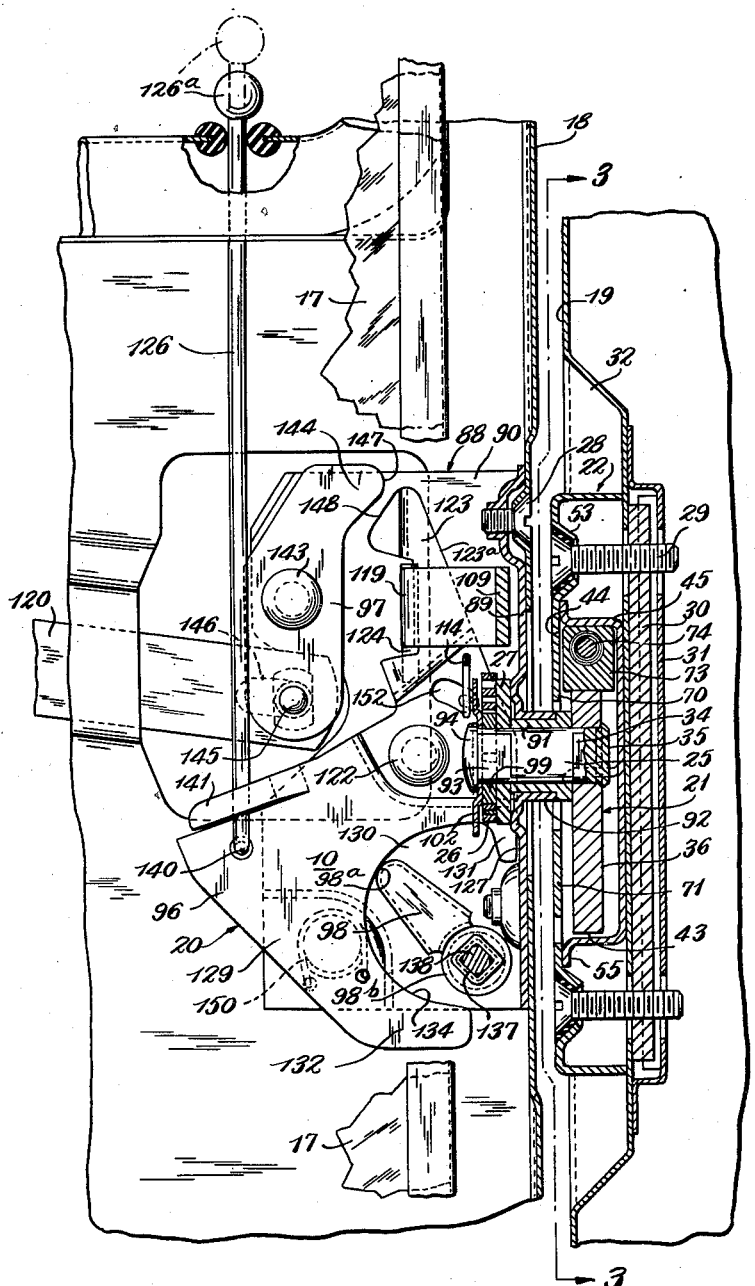
Fig. 4 is a vertical section taken through the door control mechanism as indicated by section line 4—4 of Figs. 2 and 3, the section being taken through the latch device and associated keeper with the door in its fully closed and latched condition.

The locking lever 96 is a lever of an irregular shape which lies adjacent to the plate portion 89 and is swingably mounted on the latter by a pivot member 122 having a riveted or otherwise fixed connection with such plate portion. The locking lever 96 is provided with an upper locking arm 123 extending above the pivot 122 and having a locking recess or notch 124 therein. The notch 124 faces toward the arm portion 119 of the detent lever 95 for straddling engagement with the latter, as shown in Fig. 4, when the locking lever 96 is swung in a counterclockwise direction on the pivot 122. When the notch 124 straddles the arm portion 119, the detent lever 95 will be held by the locking lever 96 with the detent 112 engaged with the tooth 106 of the control member 27, thereby maintaining the latch member 21 in a locked condition in its door-latched position 21ᶜ.

Swinging of the locking lever 96 in the counterclockwise direction to its locking position of Fig. 4, can be produced either by the control finger 98 or by a pull rod 126. Swinging of the locking lever 96 in the clockwise direction to its released position with the notch 124 disengaged from the arm portion 119 can be produced by the control lever 97, by the control finger 98 or by the pull rod 126. In the released position of the locking lever 96, the straight edge 123a of the arm 123 is engaged against the wall portion 89 as a stop means. Similarly, when the locking lever is in its locking position, the straight edge 127 of this lever is engaged against the wall portion 89 as a stop means, as shown in Fig. 4.

The lower portion of locking lever 96 comprises a relatively wide arm 129 in depending relation to the pivot 122. The arm 129 has a notch 130 therein in which the control finger 98 is located. The notch 130 is of a crescent-like shape and portions of the arm 129 form a pair of horns 131 and 132 at opposite ends of the crescent. The horn 131 constitutes a cam lug which is engageable by the finger 98 during swinging of the latter in a clockwise direction, as seen in Fig. 4, for swinging the locking lever 96 to its locking position. The concave edge of the horn 132 forms a cam 134 with which the rounded end 98ᵃ of the finger 98 has a sliding and camming engagement for swinging the locking lever 96 clockwise to its released position.

As shown in Figs. 2 and 4, the control finger 98 is actuatable by a key-controlled lock 136 carried by the door 11. For this purpose, the finger 98 has the hub 98ᵇ thereof provided with a non-circular opening 137, and the lock 136 has a non-circular actuating stem 138 engaged in the opening 137.

The pull rod 126 is manually operable from inside the vehicle, as by having a knob 126ᵃ located on the door 11 adjacent the window glass 17. The lower end of the rod 126 is here shown as being connected to the arm 129 of the locking lever 96 at a point offset from the pivot 122. The connection of the rod 126 with the arm 129 can be made by having the bent end 140 engaged in an opening of this arm and retained therein by a sheared and deflected finger portion 141 of the arm 129. An upward pull on the rod 126 will swing the locking lever 96 clockwise toward its released position thereby disengaging the notch 124 from the arm portion 119 of the detent lever 95, and a downward movement of the rod 126 will swing the lever 96 counterclockwise toward its locking position for engaging the notch 124 with the arm portion 119.

The control lever 97 is swingably mounted on the plate portion 90 by a pivot member 143 of the latter and has a straight-edged hook portion 144 adjacent its upper end which engages the upper edge of the arm portion 119 of the detent lever 95. The lower end of the lever 97 carries a pivot pin 145 to which the link 120 is connected, as by means of the slot 146. Engagement of the hook portion 144 with the arm portion 119 in response to clockwise swinging of the lever 97 by the link 120, will cause clockwise swinging of the detent lever 95 to disengage the detent 112 from the tooth 106 (or the tooth 105) of the control member 27 for unlatching the door 11.

If the locking lever 96 happens to be in its locking position of Fig. 4 at the time when the control lever 97 is being swung clockwise in the door-unlatching direction by the link 120, the control lever will first swing the locking lever 96 to its released position and will then actuate the detent lever 95 by engagement of the hook portion 144 with the arm portion 119 as explained above. For causing this release actuation of the locking lever 96, the control lever 97 is provided with a rounded thrust portion 147 at its upper end which will engage and exert a sliding and camming action on the sloping edge 148 provided on the arm 123 just above the notch 124.

The swinging movements of the locking lever 96 to its release position and to its locking position are partially controlled by a spring 150 having an over-center action and which lies between the locking lever and the plate portion 90, as shown in Fig. 4. This spring can be a wire coil spring of a generally flat character and having its ends projecting axially therefrom in opposite directions at substantially right angles to the plane of the spring. The spring 150 is suspended between the locking lever 96 and the plate portion 90 by having one of its ends engaged in an opening of the locking lever and its other end engaged in an opening of this plate portion. The location of the spring 150 in relation to the pivot 122 is such that when the locking lever 96 is swung in a clockwise direction by the control lever 97, the control finger 98 or the rod 126, for a sufficient distance to disengage the notch 124 from the arm portion 119, the spring will be stressed and will react on the locking lever to cause a continuation of the clockwise movement thereof until the edge 123ª of the arm 123 engages the plate portion 89. Similarly, when the locking lever 96 is swung in a counterclockwise direction by the finger 98 or the rod 126 for shifting this lever from its released position toward its locking position and the extent of such counterclockwise movement is sufficient to bring the notch 124 into straddling relation to the arm portion 119, the spring 150 will be stressed and will then assist such counterclockwise movement for completing and holding the locking engagement of the notch 124 with the arm portion 119.

The locking lever 96 can be provided with a suitable clearance opening 151 (see Fig. 17) for accommodating the hook end 101 of the spiral spring 26 which engages the plate portion 90. This lever can also be provided with a clearance opening 152 (see Fig. 4) to accommodate the arm 114 of spring 113 which also engages the plate portion 90.

Figs. 9 to 17 inclusive of the drawings show a modified closure control means 155 which is generally similar to the closure control means 10 of Figs. 1 to 8 inclusive and which can be applied to a vehicle door for accomplishing the same purpose, namely the achievement of a fore and aft safety interlock between a latch member 156 and its associated keeper 157 for preventing accidental opening of the door in the event of a collision. This modified door control mechanism 155 comprises, in general, a latch device 158 having a rockshaft 25 extending through an edge wall 160 of a door 161 and supporting the latch member 156 adjacent such edge wall for cooperation with the keeper 157 which is mounted on the edge wall 162 of an associated door frame or body pillar 163. The latch device 158 is substantially identical with the latch device 20 of Figs. 1, 2 and 4 and functions in a similar manner in actuating and controlling the latch member 156, and accordingly the same reference characters have been used in the latch device 158 for designating corresponding components thereof.

The latch member 156 of the latch device 158 is of a somewhat different form than the above-described latch member 21 and cooperates with its keeper 157 in a somewhat different manner. The latch member 156 is here shown as comprising a body portion 165, a latch arm 166 and an axial thrust means comprising web or flange portions 167 and 168 adjacent the latch arm 166 and lying on opposite sides thereof. The latch member 156 can be constructed as a one-piece member but is here shown as comprising a disk 169 and a contoured plate 170 fixed on the rockshaft 25 in a face-to-face relation. The plate member 170 has an edge portion which is an arc or circular segment conforming to the curvature of the disk 169 such that the edge of the disk and the edge of the plate member cooperate in forming an edge cam 171 on the body portion 165 and which cam is located generally above and eccentric to the axis of the rockshaft 25.

The latch arm 166 is formed by a contoured portion of the plate member 170 and extends below or in depending relation to the rockshaft 25. The disk portions 167 and 168 are exposed on opposite sides of the latch arm 166 and constitute an axially facing thrust means for cooperation with the keeper 157 in a manner to be explained hereinafter. The latch arm 166 can have any appropriate contour and length and has a convexly rounded free end 172 at the lower end thereof. The latch member 156 also has two generally radial and downwardly facing abutment shoulders providing contact elements 173ª and 173ᵇ thereon on opposite sides of the arm 166 and formed by substantially straight edge portions of the plate 170.

The keeper 157 is a vertically elongated generally flat hollow structure comprising a housing or front cover member 174 and an inner means in the cover member and which, in this instance, is formed by upper and lower rear members 175 and 176. The cover member 174 is preferably a sheet metal stamping and has a generally flat front wall 177 and a marginal or edge flange 178 extending rearwardly from the front wall around the perimeter thereof. The cover member 174 thus has a rearwardly dished shape defining a shallow rear chamber in which the rear members 175 and 176 are located. Adjacent the upper end of the keeper, the front wall 177 is provided with a pair of inwardly deflected bosses 179 defining an upper pair of countersunk screw holes and, similarly, a pair of inwardly deflected bosses 180 on the front wall adjacent the lower end of the keeper define a lower pair of such countersunk screw holes. The keeper 157 is mounted on the edge wall 162 of the door frame 163 by connecting screws 181 extending through such holes. The fastening screws which extend through the holes of the bosses 179 also extend through the upper rear member 175 and, likewise, the fastening screws which extend through the holes of the bosses 180 also extend through the lower rear member 176.

The keeper 157 has a recess 183 extending thereinto through one edge thereof and lying substantially in the plane of the keeper. The marginal flange 178 of the cover member 174 is interrupted on one side of the keeper to provide an access opening 184 leading into the recess 183. The front wall 177 has a notch 185 lying in the plane thereof and extending inwardly from the access opening 184 to provide clearance for the rockshaft 25 during movement of the latch member 156 into the keeper.

The upper and lower rear members 175 and 176 are suitably secured in the rear chamber of the cover member 174 and are located on opposite sides of the access opening 184. The upper rear member 175 can be a preformed hollow cup-like sheet metal stamping having a rearwardly extending curved edge flange 185 lying against the marginal flange 178 of the cover member 174 and a straight transverse edge flange 186. Cooperating portions of the rear member 175 and the cover member define an upper pocket portion or locking pocket 187 which is in communication with the recess 183 and constitutes an upward extension thereof. The extreme upper portion of the locking pocket 187 defines a transverse guideway 189 extending along the flange 186 and corresponding with the guideway 61 of the keeper 22. The rear member 175 has a substantially flat front wall 190 provided with a pair of laterally spaced openings 191 into which the upper screw-receiving bosses 179 of the housing 174 extend. A wedge block 193 is provided in the guideway 189 for cooperation with the cam 171 of the latch member 156 in substantially the same manner and for the same purpose as has been described above for the wedge block 73.

The lower rear member 176 is shown as being in the form of a preformed hollow cup-like sheet metal stamping which is suitably secured in the cover member 174 and has a rearwardly extending edge flange 194 lying against a portion of the marginal flange 178 of the cover member. The rear member 176 has a substantially flat front wall 195 which is provided with a pair of laterally spaced openings 196 into which the lower screw-receiving bosses 180 of the housing 174 extend. The rear member 176 also has a rearwardly extending edge flange 198 on the side thereof facing the recess 183 and which has a concave contour for defining a lower pocket portion or locking pocket 199. This pocket is in communication with the recess 183 and constitutes a downward extension thereof.

Portions of the front wall 177 located above and below the notch 185 form upper and lower cover portions 200 and 201. The upper cover portion 200 overlies the upper locking pocket 187. The lower cover portion 201 overlies the lower locking pocket 199. The contoured flange 198 has a free rear edge which is in an exposed relation within the keeper and forms a stop means 202 facing axially away from the front wall 177 for restraining or latch-retaining cooperation with the thrust portions 167 and 168 of the latch member 156 for preventing the above-mentioned fore and aft separation when the arm 166 is engaged in the locking pocket 199. The cover member portions 200 and 201 which overlie the upper and lower pocket portions 187 and 199 of the keeper recess also form latch-retaining elements engageable, respectively, by the body and arm portions of the latch member 156 for preventing the fore and aft separation between the door and doorframe.

The keeper 157 is provided with a convexly curved striker portion or striker element 204 just below the access opening 184. This striker portion is defined by a portion of the marginal flange 178 which extends partway into the access opening and toward the lower locking pocket 199 a sufficient distance to overlie the adjacent end of the curved edge wall 198 as shown in the drawings.

Figs. 12, 13 and 14 of the drawings show different relative positions of the latch member 156 during the movement of this latch member into the keeper 157. The movement of the latch member 156 into the keeper 157 takes place as a combined translatory and swinging movement as the door 161 is moved toward its closed position, similar to the action described above in greater detail in connection with the latch member 21. Fig. 12 shows the initial position 156$^a$ of the latch member when the latch arm 166 has entered the recess 183 of the keeper 157 as the result of a closing movement of the door 161 and the abutment shoulder 173$^a$ has just come into engagement with the striker portion 204. At this time the cam 171 of the body portion 165 of the latch member has also moved part-way into the upper locking pocket 187 and has engaged the sloping face of the wedge block 193.

Fig. 13 shows an intermediate position of the latch member 156 which corresponds with the secondary latch position of the door. The further inward movement of the door after the latch member has arrived at the position 156$^a$ shown in Fig. 12, causes a counterclockwise swinging movement of the latch member by reason of the engagement of the abutment 173$^a$ with the striker portion 204 in an offset or eccentric relation to the rockshaft axis. This engagement of the abutment 173$^a$ with the striker portion 204 causes the latch arm 166 to be swung downwardly and to move substantially endwise thereof into the lower locking pocket 199.

The movement of the latch member 156 to its secondary latch position 156$^b$ of Fig. 13, results in the cam 171 of the body portion 165 being moved farther into the upper locking pocket 187 and along the sloping face of the wedge block 193, and also results in the latch arm 166 extending part-way into the lower locking pocket 199. When the latch member 156 is in the position 156$^b$, portions of the thrust elements 167 and 168 lie behind the stop means 202 such that the arm 166 is confined against accidental or undesired relative separating movement with respect to the keeper 157 in an axial or generally fore and aft direction.

Fig. 14 shows the position 156$^c$ of the latch member 156 when it has arrived at the door-latched position in which the latch arm 166 extends into the lower locking pocket 199 for the full depth thereof. At this time the cam 171 of the body portion 165 is still in engagement with the wedge block 193 and has shifted the latter part-way along the guideway 189. The further movement of the latch member 156 into the keeper 157 from its 156$^b$ position results in the convexly curved end 172 of the arm 166 coming into engagement with the edge wall 198 and sliding downwardly along this wall causing a continuation of the counterclockwise rotation of the latch member until the free end of the arm is at or adjacent the lower end of the locking pocket 199.

Figure 16:
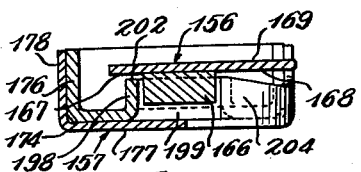
Fig. 16 is a fragmentary transverse sectional view taken through the latch member and keeper, as indicated by section line 16—16 of Fig. 14.
Figure 9:
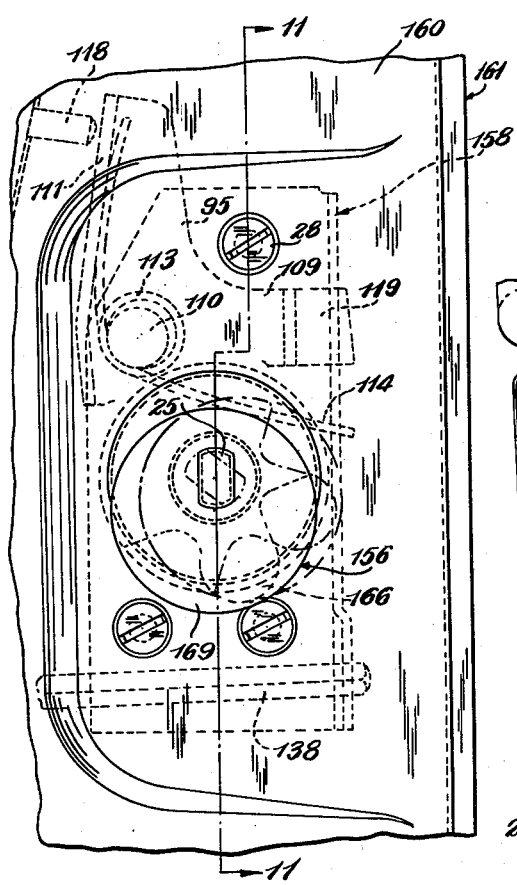
Fig. 9 is an elevational view of the rear or free edge of the left front door and showing the latch device of a modified door control mechanism which is illustrated in Figs. 9 to 17 inclusive.
Figure 10:
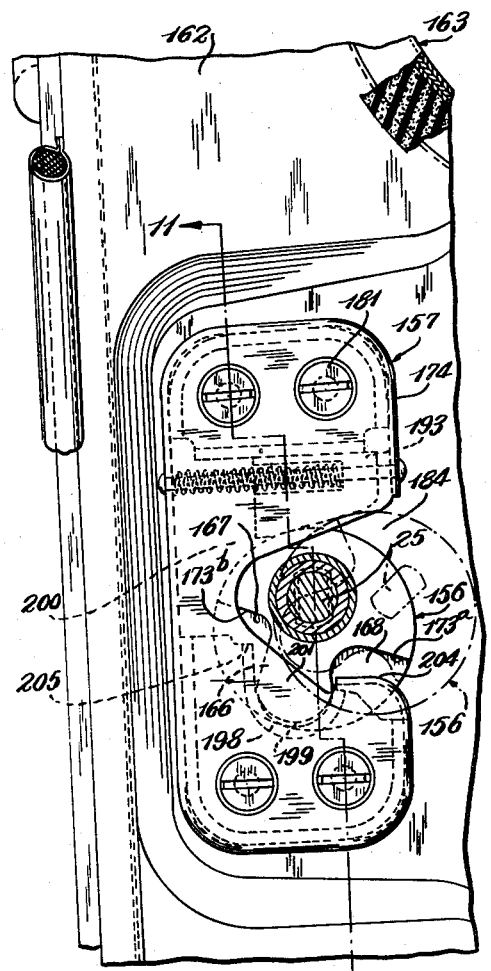
Fig. 10 is a vertical sectional edge view taken on line 10—10 of Fig. 11 and looking toward the keeper of the modified door control mechanism.

When the latch member 156 is in the door-latched position 156$^c$ of Fig. 16, the thrust portions 167 and 168 lie opposite the curved stop 202 and are overlapped to a substantial extent by the latter. The stop 202 will therefore be very effective in preventing a relative axial or fore and aft separating movement between the latch arm 166 and the lower locking pocket 199 of the keeper 157.

If the door 161 is closed with a slamming action, the latch member 156 will be moved into the keeper 157 beyond its door-latched position 156$^c$ and will be subjected to a further combined rotary and translatory movement. The additional rotary movement will be in a counterclockwise direction, as seen in Fig. 14, and will result in the abutment 173$^b$ coming into engagement with a stop 205 formed by the upper edge of the curved wall 198. By the time that the abutment comes into engagement with the stop 205, the spiral spring 26 of the latch device 158 will have been stressed to an extent such that it will be very effective in minimizing the shock of the door slam.

The latch device 158 of the door control mechanism 155 is of substantially the same construction as the latch device 20 and functions in a similar manner for the actuation and control of the latch member 156, and accordingly, the various parts and components of the latch device 158 which correspond with those of the latch device 20 have been designated by the same reference characters.

In the control mechanism 155, the restraining action for preventing a fore and aft separation between the latch member 156 and the keeper 157 results mainly from the cooperation of the thrust portions 167 and 168 with the stop 202 of the insert 176, and accordingly, the housing 174 of the keeper can be made of relatively lighter sheet metal as shown in Figs. 11 and 14 to 16. If desired, however, the proportions of the latch member 156 and keeper 157 can be such that when the latch member is in its door-latched position 156$^c$, portions of the front face of the latch member will be immediately adjacent the rear side of the cover portions 200 and 201 of housing 174, and in which case, these cover portions will also constitute a restraining means for preventing a fore and aft relative separation between the latch member and keeper. Even in their presently shown location, the cover portions 200 and 201 will function as a restraining means for the latch member in the event of failure of the thrust portions 167 and 168 thereof.

Figs. 18 to 22 of the drawings show a keeper 210 for use as a part of a closure control means comprising a latch device and a keeper and is intended to be used in the same relation as the above-described keepers 22 and 157. The latch device is here represented only by its latch member 211 and the supporting rockshaft 25. The latch member 211 is of the same general form as the above-described latch member 156 except that it is preferably made as a one-piece plate member and does not have the thrust portions 173$^a$ and 173$^b$. Corresponding portions of the latch member 211 are designated by the same reference characters as have been used for the latch member 156.

The keeper 210 is a vertically elongated generally flat hollow structure having a recess 212 extending edgewise thereinto from an access opening 213 in one edge of the structure. This keeper comprises, in general, a front cover member 214 and an inner means which is here shown as comprising a rear member 215 and an insert means or member 216 disposed between the cover member and rear member.

The cover member 214 is a sheet metal member having a substantially flat front wall 217 provided with a notch 218 extending thereinto from the access opening 213 to accommodate the rockshaft 25 which supports the associated latch member 211. The cover member 214 also has a rearwardly extending marginal flange 219 around the perimeter thereof and which is interrupted along an intermediate portion of one side edge of the keeper by the access opening 213.

The rear member 215 is a sheet metal member having end portions connected by an intermediate plate portion 221. This member is disposed with its plate portion 221 in a substantially parallel spaced relation to the front wall 217 of the cover member 214. Adjacent the upper end thereof, the rear member 215 is provided with a forwardly offset transversely extending wall portion 222 and at its extreme upper end is provided with a forwardly extending edge flange 223. The front edge of the flange 223 has a lug 224 thereon which is of a relatively low height and which is relatively short longitudinally of this flange and located substantially at the mid-point thereof. Adjacent its lower end, the rear member has a substantially flat wall portion 225 which is offset toward the front wall 217. The rear member 215 is of a size and shape to fit into the shallow rear pocket of the cover member 214, with edge portions of the rear member lying adjacent the edge flange 219 and with the top or end flange 223 extending forwardly into the pocket substantially to the rear side of the front wall 217, as shown in Fig. 22.

The rear member 215 can be retained in the cover member 214 by any suitable connecting means, such as the lug projection 226 of the flange 219 which has been deflected against the wall portion 222 on the rear side of the latter, and the small swaged lugs 227 formed on the flange 219 at spaced points along the edge of the wall portion 225. The lug 224 provides a contact portion of relatively small area on the flange 223 which can be readily crammed against and into the rear corner fillet of the housing 214, by the clamping pressure being applied to the keeper during the deflecting of the lug 226 against the wall portion 222.

The insert 216 can be a one-piece preformed member, but as here shown, comprises two similar plate members in a face-to-face relation. This insert is of a hardened character, that is, the metal thereof is relatively harder than that of the cover member, and is located in the lower portion of the keeper 210 so as to lie between a rearwardly offset annular portion 228 of the front wall 217 and the rear wall portion 225. As shown in Fig. 22, the insert 216 has an axial opening 229 into which the central areas of the wall portions 225 and 228 have been deflected. The opening 229 accommodates the stem of the lower keeper-mounting screw 230 and the central area of the wall portion 228 forms a countersink for the head of this screw.

The insert 216 has a concavely contoured upper portion defining a blower locking pocket 232 which faces the recess 212 and communicates therewith as a pocket portion and downward extension thereof. The concavely contoured portion of the insert 216 defines the edge wall 233 of this locking pocket. A portion of the insert lying on one side of the pocket 232 forms a hook element 234 for retaining the latch arm 166 in the pocket 232 and its convexly contoured upper end extends into the access opening 213 to form a striker portion 235.

Cooperating portions of the cover member 214 and the rear member 215 define an upper pocket portion or locking pocket 237 in the keeper 210 and which is in communication with the recess 212 as an upward extension thereof. The extreme upper portion of the pocket 237 forms a transverse guideway 238 in which a wedge block 239 is located and cooperates with the body portion 165 of the latch member 211 in the same manner and for the same purpose as has been described above for the keepers 22 and 157.

From the construction above described, it will be seen that portions of the front wall 217 extend over and across the upper and lower locking pockets 237 and 232 of the keeper 210 as latch-retaining elements 241 and 242 which constitute a confining and restraining means for the latch member 211 by which a fore and aft interlock is established between the keeper and latch member when the latter is engaged in the keeper in its secondary latch position 211$^b$ of Fig. 19, and more particularly, when the latch member is in its door-latched position 211$^c$ of Fig. 20. Since the retaining elements formed by the cover member portions 241 and 242 of the front wall 217 overlie the upper and lower locking pockets, they will effectively prevent an accidental axial or fore and aft relative disengaging movement between the latch member and the keeper, such that the disengaging movement of the latch member will be confined to a movement substantially in its own plane and to the plane of the recess 212.

Figs. 18 to 21 inclusive show the different positions assumed by the latch member 211 relative to the keeper 210 during door closing movement. Fig. 18 represents the initial position 211$^a$ of the latch member as the latter has started to move into the recess 212 of the keeper. In the secondary latch position 211$^b$ of Fig. 19, the arm 166 and the cam 171 of the latch member have moved part-way into the lower and upper locking pockets 242 and 241. The position 211$^c$ of Fig. 20 is the door-latched position of the latch member 211 in the keeper 210.

Fig. 21 shows the overtravel position 211$^d$ of the latch member 211 resulting from slamming of the door. The upper end of the insert portion 244 forms a stop 245 facing the recess 212. When the latch member moves to its overtravel position 211$^d$, the abutment 173$^b$ comes into engagement with the stop 245 to limit such overtravel movement.

The attachment of the keeper 210 to a door frame or body pillar is accomplished by means of an upper mounting screw 246 in addition to the above-mentioned lower mounting screw 230. The wall portion 221 of the rear member 215 is provided, at a point opposite the notch 218, with a counter sunk hole 247 to accommodate the upper mounting screw.

From the accompanying drawings and the foregoing detailed description, it will now be readily understood that this invention provides closure control means for application to associated door and door frame members and by which a three-directional control is achieved for holding the door relative to the door frame. It will now also be seen that the door control in one direction is by the achievement of a fore and aft interlock between a latch member and its associated keeper which, as previously explained herein, will prevent the door from flying open in the case of relative springing between the door and door frame member resulting from a collision.

Although the closure control means of this invention has been represented herein in different embodiments and has been illustrated and described to a somewhat detailed extent, it will be understood, of course, that the invention is not to be regarded as being correspondingly limited in scope but also includes all changes and modifications coming within the terms of the claims hereof.

Having thus described our invention, we claim:

1. In door control mechanism for use with a swingable vehicle door having an upright free edge which, in the closed position of the door, is in a substantially opposed and fore and aft aligned relation to an adjacent upright fixed edge of an associated doorframe so that the opposed edges define an intervening cleavage crevice and lie on opposite sides of an upright transverse cleavage plane; a latch device adapted for mounting on said door and having pivot means extending in a direction substantially normal to said free edge; a latch member swingable about the axis of said pivot means and comprising a body portion and an arm projecting from said body portion; said body portion and arm lying in a common plane; a keeper adapted for mounting on said fixed edge so as to lie in said cleavage crevice; said keeper comprising a hollow metal cover member and inner means; said cover member having a front wall lying substantially in said cleavage plane and a marginal flange carried by said front wall and extending rearwardly therefrom with the rear edge portion of the marginal flange presented toward said fixed edge; said inner means being disposed in said cover member and encompassed by said front wall and marginal flange; said marginal flange extending substantially around the perimeter of said cover member and having an access opening therein for movement of said latch member into and out of said keeper, and said front wall having a notch therein to accommodate said pivot means; said keeper having a recess therein for receiving said latch member and including pocket portions on opposite sides of said notch for receiving portions of said arm and body portion; cooperating portions of said cover member and inner means defining said pocket portions with portions of said front wall forming latch-retaining elements on opposite sides of said notch and overlying said pocket portions; said latch-retaining elements being engageable respectively by said body portion and arm for preventing fore and aft separation between said door and doorframe by confining the keeper-disengaging movement of said latch member to movement thereof substantially in said cleavage plane; and fastening means extending through the cover member front wall for mounting the keeper on the doorframe with the free edge portion of said marginal flange seating against said fixed edge of the doorframe.

2. Door control mechanism as defined in claim 1 wherein said fastening means comprises spaced fasteners extending through said front wall at points thereof located on said opposite sides of said notch.

3. Door control mechanism as defined in claim 1 wherein said inner means comprises a rear member having end portions and an intermediate plate portion connecting said end portions; said end portions extending toward and engaging the rear side of said front wall, and said plate portion being spaced from said front wall so as to form a rear wall on the keeper for flatwise engagement with said fixed edge.

4. Door control mechanism as defined in claim 1 wherein said inner means comprises rear members located on said opposite sides of said notch; and wherein said fastening means comprises spaced fasteners extending through said rear members and through said front wall at points of the latter which are located on said opposite sides of said notch.

5. Door control mechanism as defined in claim 1 wherein the portion of said inner means associated with one of said pocket portions has flange means thereon forming a stop means facing axially away from said front wall; and wherein said latch member has axially facing thrust means thereon adjacent said arm and engageable with said stop means for preventing said fore and aft separation.

6. Door control mechanism as defined in claim 1 wherein said latch member has a shoulder providing a contact element thereon at one side of said arm; and wherein a portion of said marginal flange located on one side of, and immediately adjacent to, said access opening provides a striker element on said keeper; said striker element being engageable by said contact element for causing pivotal movement of said latch member during movement thereof into said keeper.

7. Door control mechanism as defined in claim 1 wherein said inner means comprises a rear member having end portions and an intermediate plate portion connecting said end portions; one of said end portions being spaced from said front wall, and said plate portion being spaced from said front wall so as to form a rear wall on the keeper for flatwise engagement with said fixed edge; and wherein the pocket portion which receives said arm of the latch member is formed at least in part by insert means disposed between said front wall and said one end portion; said fastening means comprising a fastener extending through said insert means.

8. Door control mechanism as defined in claim 7 wherein said insert means is of relatively harder metal than said cover member; a portion of said insert means projecting into said access opening in an exposed relation as a striker element and being engageable by a portion of said latch member for causing pivotal movement of the latch member during movement thereof into said keeper.

9. In door control mechanism for use with a swingable vehicle door having an upright free edge which, in the closed position of the door, is in a substantially opposed and fore and aft aligned relation to an adjacent upright fixed edge of an associated doorframe so that the opposed edges define an intervening cleavage crevice and lie on opposite sides of an upright transverse cleavage plane; a latch device adapted for mounting on said door and having pivot means extending in a direction substantially normal to said free edge; a latch member swingable about the axis of said pivot means and comprising a body portion and an arm projecting from said body portion; said body portion and arm lying in a common plane; a keeper adapted for mounting on said fixed edge so as to lie in said cleavage crevice; said keeper comprising a hollow metal cover member and inner means; said cover member having a front wall lying substantially in said cleavage plane and a marginal flange carried by said front wall and extending rearwardly therefrom with the rear edge portion of the marginal flange presented toward said fixed edge; said inner means being disposed in said cover member and encompassed by said front wall and marginal flange; said marginal flange extending substantially around the perimeter of said cover member and having an access opening therein for movement of said latch member into and out of said keeper, and said front wall having a notch therein to accommodate said pivot means; said keeper having a recess therein for receiving said latch member and including pocket portions on opposite sides of said notch for receiving portions of said arm and body portion; cooperating portions of said cover member and inner means defining said pocket portions with portions of said front wall forming latch-retaining elements on opposite sides of said notch and overlying said pocket portions; said latch-retaining elements being engageable respectively by said body portion and arm for preventing fore and aft separation between said door and doorframe by confining the keeper-disengaging movement of said latch member to movement thereof substantially in said cleavage plane; fastening means extending through the cover member front wall for mounting the keeper on the door frame with the free edge portion of said marginal flange seating against said fixed edge of the doorframe; one of said pocket portions also defining a guideway in said keeper; and a thrust block shiftable in said guideway in response to camming engagement of said body portion of the latch member thereagainst.

References Cited in the file of this patent

UNITED STATES PATENTS

| | | |
|---|---|---|
| 1,203,595 | Evensen | Nov. 7, 1916 |
| 1,490,874 | Webb | Apr. 15, 1924 |
| 1,709,915 | Morris | Apr. 23, 1929 |
| 1,711,213 | Smith | Apr. 30, 1929 |
| 1,815,580 | Otte | July 21, 1931 |
| 2,156,874 | Schonitzer | May 2, 1939 |
| 2,231,075 | Lakin | Feb. 11, 1941 |
| 2,235,949 | Shaw | Mar. 25, 1941 |
| 2,246,786 | Dall | June 24, 1941 |
| 2,505,945 | Dath | May 2, 1950 |
| 2,608,428 | Allen | Aug. 26, 1952 |
| 2,674,483 | De Vito | Apr. 6, 1954 |

FOREIGN PATENTS

| | | |
|---|---|---|
| 393,355 | Great Britain | June 8, 1933 |
| 732,190 | Great Britain | June 22, 1955 |

OTHER REFERENCES

Popular Science, October 1955, pp. 100, 101, 250.